(12) United States Patent
Sen et al.

(10) Patent No.: US 10,510,224 B2
(45) Date of Patent: Dec. 17, 2019

(54) HAPTIC ACTUATOR HAVING MOVABLE BODIES ALONG AN ARCUATE PATH OF TRAVEL AND RELATED METHODS

(71) Applicant: Apple Inc., Cupertino, CA (US)

(72) Inventors: Yi-Heng Sen, San Jose, CA (US); Jere C. Harrison, San Jose, CA (US); Alex J. Speltz, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/945,912

(22) Filed: Apr. 5, 2018

(65) Prior Publication Data

US 2019/0311588 A1 Oct. 10, 2019

(51) Int. Cl.
| | |
|---|---|
| G08B 6/00 | (2006.01) |
| B06B 1/10 | (2006.01) |
| B06B 1/14 | (2006.01) |
| H02K 33/12 | (2006.01) |
| B06B 1/04 | (2006.01) |
| H02K 7/065 | (2006.01) |
| B06B 1/12 | (2006.01) |
| H02K 33/00 | (2006.01) |
| A63F 13/285 | (2014.01) |
| H02K 33/02 | (2006.01) |
| H02K 7/06 | (2006.01) |

(52) U.S. Cl.
CPC ............. *G08B 6/00* (2013.01); *A63F 13/285* (2014.09); *B06B 1/045* (2013.01); *B06B 1/10* (2013.01); *B06B 1/12* (2013.01); *B06B 1/14* (2013.01); *H02K 7/06* (2013.01); *H02K 7/065* (2013.01); *H02K 33/00* (2013.01); *H02K 33/02* (2013.01); *H02K 33/12* (2013.01)

(58) Field of Classification Search
CPC .. G08B 6/00; B06B 1/045; B06B 1/10; B06B 1/12; B06B 1/14; B06B 1/0633; H02K 7/06; H02K 7/065; A63F 13/285; G06F 3/016
See application file for complete search history.

(56) References Cited

U.S. PATENT DOCUMENTS

| | | | |
|---|---|---|---|
| 7,768,160 B1 * | 8/2010 | Sahyoun | H02K 33/16 310/14 |
| 8,169,402 B2 | 5/2012 | Shahoian et al. | |
| 2004/0203530 A1 * | 10/2004 | Liang | B06B 1/045 455/90.3 |
| 2011/0260988 A1 | 10/2011 | Colgate et al. | |

(Continued)

FOREIGN PATENT DOCUMENTS

| | | |
|---|---|---|
| WO | 2013169299 A1 | 11/2013 |
| WO | 2013169303 A1 | 11/2013 |

(Continued)

OTHER PUBLICATIONS

Product Specification Sheet: GEEPLUS, VIBRO1 Vibration Actuator, 2 pages, www.geeplus.biz, downloaded on Jul. 15, 2015.

*Primary Examiner* — Laura N Nguyen
(74) *Attorney, Agent, or Firm* — Allen, Dyer, Doppelt + Gilchrist, P.A.

(57) ABSTRACT

A haptic actuator may include first and second bodies movable along an arcuate path of travel. The haptic actuator may also include a biasing member coupled between the first and second bodies. At least one electrical coil may be configured to move the first and second bodies to produce a haptic effect.

31 Claims, 6 Drawing Sheets

(56) References Cited

U.S. PATENT DOCUMENTS

| | | |
|---|---|---|
| 2013/0027324 A1 | 1/2013 | Martin et al. |
| 2014/0197936 A1 | 7/2014 | Biggs et al. |
| 2015/0109223 A1 | 4/2015 | Kessler et al. |
| 2015/0116205 A1 | 4/2015 | Westerman et al. |
| 2015/0130730 A1 | 5/2015 | Harley et al. |
| 2015/0194870 A1* | 7/2015 | Kim ............... H02K 33/18 310/25 |
| 2015/0206639 A1 | 7/2015 | Odajima et al. |
| 2017/0083093 A1 | 3/2017 | Hajati et al. |
| 2018/0101232 A1* | 4/2018 | Levesque ............ G06F 3/016 |
| 2018/0126265 A1* | 5/2018 | Alghooneh ........ A63F 13/285 |
| 2018/0211751 A1* | 7/2018 | Khoshkava .......... H01F 7/081 |

FOREIGN PATENT DOCUMENTS

| | | |
|---|---|---|
| WO | 2013169305 A1 | 11/2013 |
| WO | 2013170099 A1 | 11/2013 |
| WO | 2013188307 A2 | 12/2013 |
| WO | 2014018111 A1 | 1/2014 |
| WO | 2015020663 A1 | 2/2015 |

\* cited by examiner

HAPTIC ACTUATOR HAVING MOVABLE BODIES ALONG AN ARCUATE PATH OF TRAVEL AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include first and second bodies movable along an arcuate path of travel. The haptic actuator may also include a biasing member coupled between the first and second bodies. At least one electrical coil may be configured to move the first and second bodies to produce a haptic effect.

The haptic actuator may also include arcuate track mounting the first and second bodies, for example. The haptic actuator may also include a pivot point mounting the first and second bodies, for example. The arcuate path of travel may include at least a portion of a circular path of travel.

The haptic actuator may further include a controller configured to operate the at least one electrical coil to move the first and second bodies in opposite directions, for example. The haptic actuator may also include a controller configured to operate the at least one electrical coil to move the first and second bodies in a common direction, for example. The first and second bodies may each have a same mass.

The first and second bodies each may include magnetic material. The biasing member may include a spring, for example.

A method aspect is directed to a method of producing a haptic effect. The method may include operating at least one electrical coil of a haptic actuator to move first and second bodies of the haptic actuator along an arcuate path of travel to produce the haptic effect. The haptic actuator may include a biasing member coupled between the first and second bodies.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
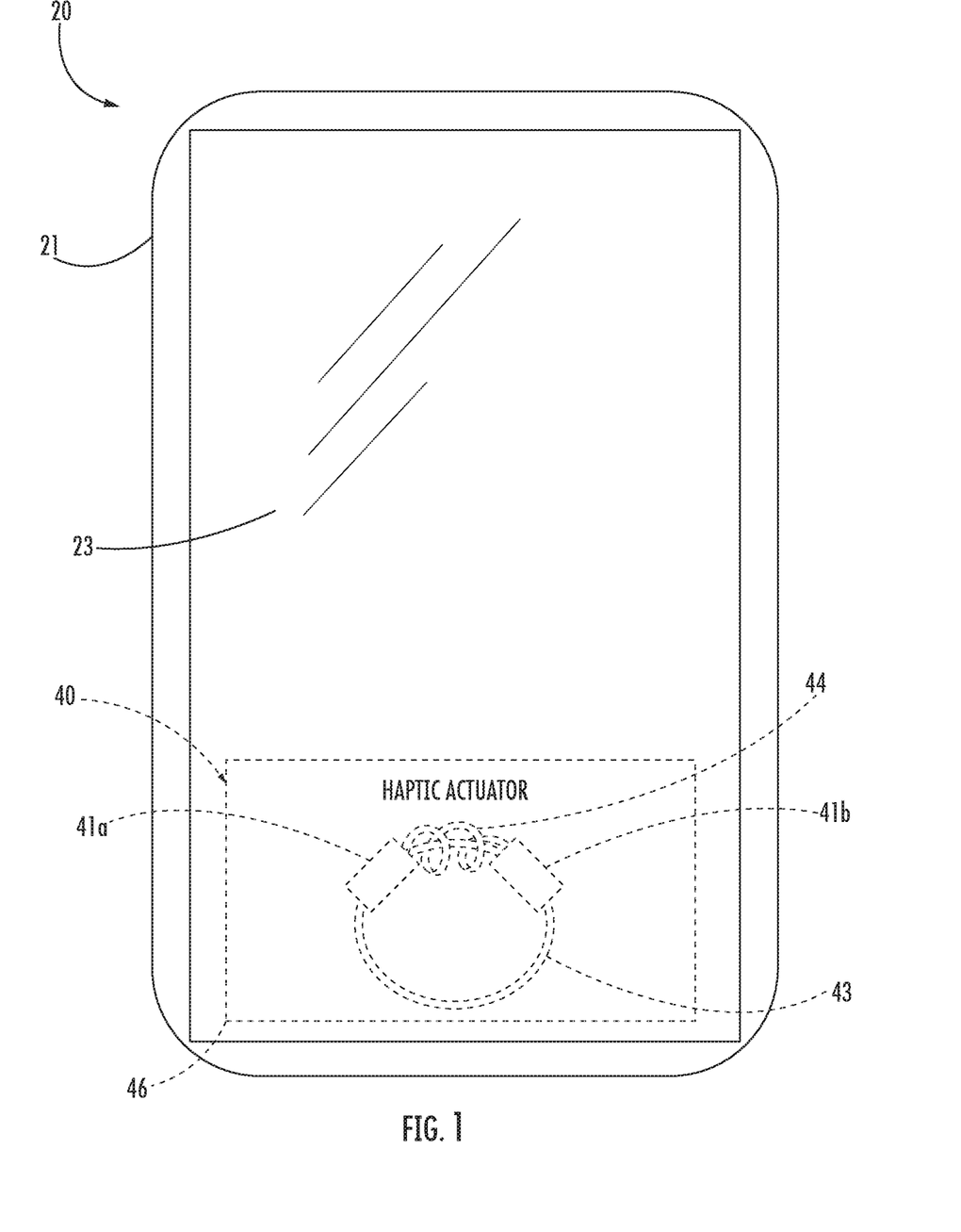
FIG. 1 is a schematic diagram of an electronic device including a haptic actuator according to an embodiment.
Figure 2:
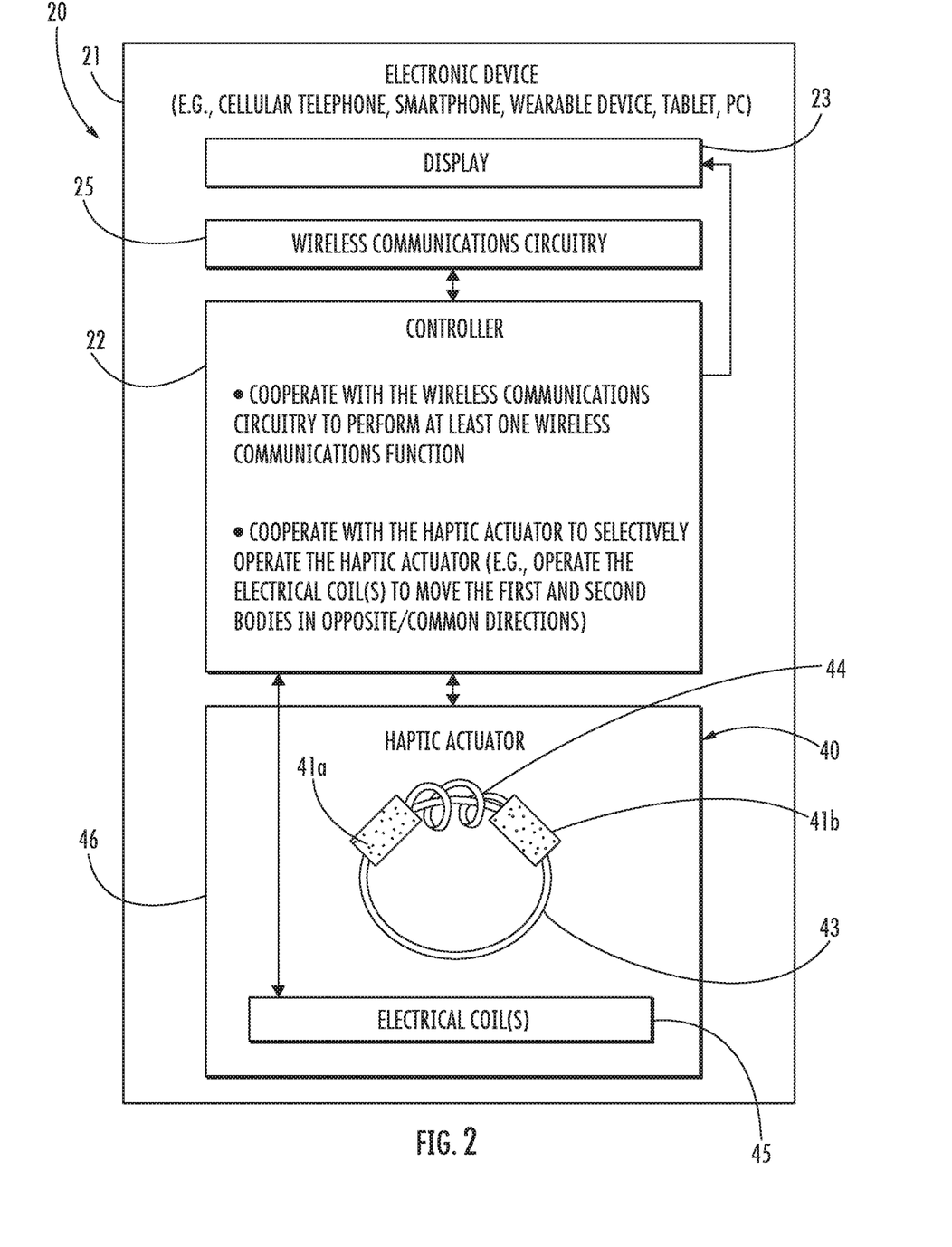
FIG. 2 is another schematic diagram of the electronic device including the haptic actuator of FIG. 1.

Referring initially to FIGS. 1-2, an electronic device 20 illustratively includes a device housing 21 and a controller 22 carried by the device housing. The electronic device 20 is illustratively a mobile wireless communications device, for example, a cellular telephone or smartphone. The electronic device 20 may be another type of electronic device, for example, a wearable device (e.g., a watch), a tablet computer, a laptop computer, a gaming device, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be, for example, a light emitting diode (LED) display, a liquid crystal display (LCD), or may be another type of display, as will be appreciated by those skilled in the art. The display 23 may be a touch display and may cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback or a haptic effect to the user in the form of relatively long and short vibrations. The vibrations may be indicative of a message received, and the duration and type of the vibration may be indicative of the type of message received. Of course, the vibrations may be indicative of or convey other types of information.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current.

The haptic actuator 40 includes an actuator housing 46 and first and second bodies 41a, 41b (e.g., masses) carried by the actuator housing and that are spaced apart and movable along an arcuate path of travel. More particularly, the haptic actuator 40 includes an arcuate track 43 that mounts the first and second bodies 41a, 41b. The arcuate path of travel illustratively includes a portion of a circular path of travel. Of course, the path of travel may be another shape, for example, oblong.

The first and second bodies 41a, 41b each includes magnetic material. The magnetic material may be interspersed within or throughout the first and second bodies 41a, 41b. In some embodiments, the magnetic material may be defined by way of a respective permanent magnet that is part of the first and second bodies 41a, 41b.

In some embodiments, the first and second bodies 41a, 41b may have a same mass. The first and second bodies 41a, 41b may each have a different mass, for example, where unbalanced operation or haptic effects from having different masses are desired.

A biasing member 44 is coupled between the first and second bodies 41a, 41b. The biasing member 44 is illustratively in the form of a spring. The biasing member 44 may be in the form of another type of biasing member, for example, a flexure. More than one biasing member 44 may be coupled between the first and second bodies 41a, 41b.

An electrical coil 45 moves the first and second bodies 41a, 41b, through cooperation with the magnetic material, to produce the haptic effect. More particularly, the controller 22 is coupled to the electrical coil 45 and operates the electrical coil to move the first and second bodies 41a, 41b in opposite directions. Alternatively, the controller 22 may operate the electrical coil 45 to move the first and second bodies 41a, 41b in a common direction. As will be appreciated by those skilled in the art, there may be more than one electrical coil 45.

Current linear resonator actuators (LRAs) or linear haptic actuators may provide a linear vibe/tap feeling in one fixed orientation along the longitudinal/traveling direction of the haptic actuator. In contrast to the present haptic actuator 40, a typical LRA, for example, may not (1) provide linear haptic feeling in any other directions once installed; and (2) provide a rotational/torque-like experience. Accordingly, the haptic actuator 40, which may be considered a hybrid haptic actuator, provides a linear haptic feeling in other directions once installed and/or a rotational/torque-like experience.

Operating principles of the haptic actuator 40 will now be described. The operating principles may be explained by analytical modeling for two cases.

Figure 3:
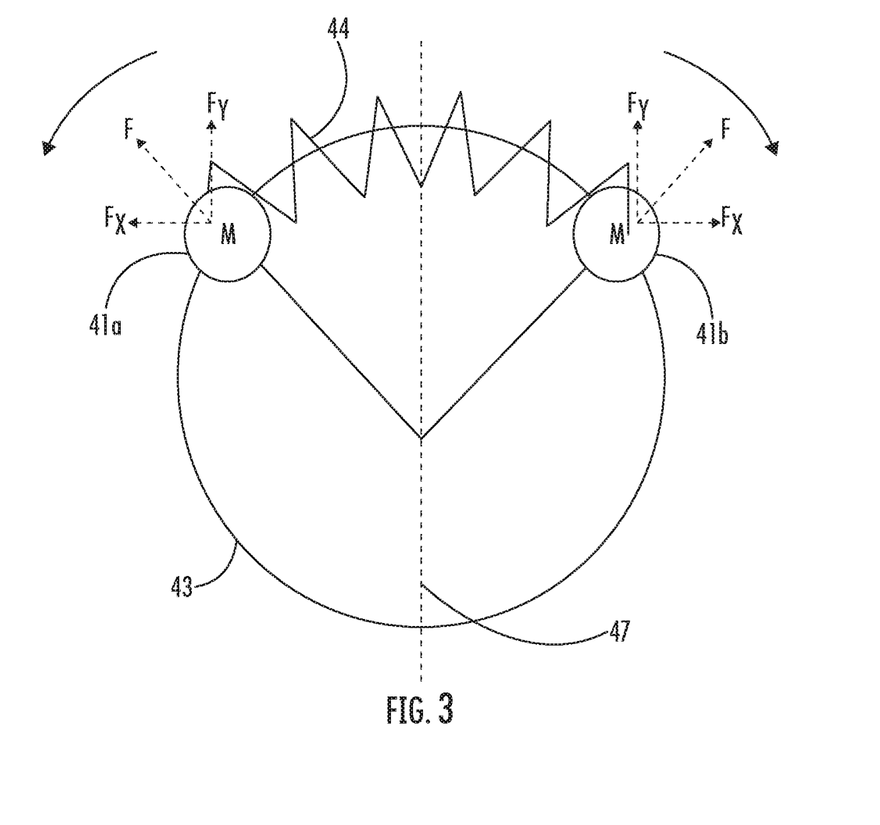
FIG. 3 is a schematic diagram illustrating an operational mode of a haptic actuator in accordance with an embodiment.

Referring now additionally to FIG. 3, one operating principle is two moving masses (i.e., the first and second bodies 41a, 41b) in an opposite angular direction. When the first and second bodies 41a, 41b rotate in opposite angular direction, the centrifugal forces from both of the first and second bodies results in a net force $2 \times F_y$, which is parallel to the angular motion line of symmetry 47, as the force $F_x$ from each of the first and second bodies is cancelled out. Assuming that w=angular speed of the mass, m=the weight of each moving mass or each of the first and second bodies 41a, 41b, and R=the radius of the arcuate track 43 or ring shaped track, the magnitude of the net force $2 \times F_y$, with the relation between the magnitude of the force and its angular speed shown below:

$$F_x(t) = mRw^2 \cos(wt) - mRw^2 \cos(wt) = 0$$

$$F_y(t) = 2 \times mRw^2 \sin(wt)$$

$$\theta(t) = wt$$

Note that since $F_y(t)$ is the force from the haptic actuator 40 to the electronic device 20, the force equation may be similar to a typical LRA. For the LRA, the linear force from the LRA (engine) to the electronic is: $m \times R_1 \times w_2 \times \sin(wt)$, where R1 is the magnitude of the displacement and w is the angular frequency of the linear vibration. In other words, despite a different architecture, the haptic actuator 40 of the present embodiments may provide the salience as an LRA. Assuming 2×m=2.5 grams, R=0.65 mm, w=2*pi*150 Hz, the resulting force $2 \times F_y$ from haptic actuator 40=1.44 N, delivering the same quality of salience as a traditional LRA. Since the symmetry line 47 of the haptic actuator 40 may be any angle, the direction of linear force from haptic actuator can be set in any angle, thereby enriching a broader haptic capability.

Figure 4:
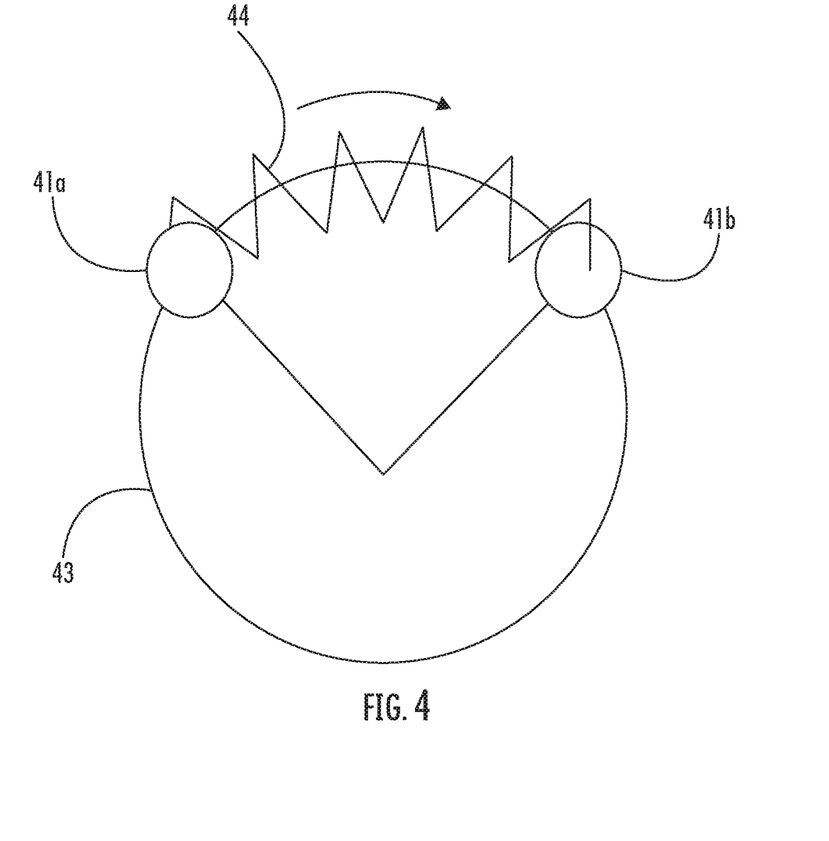
FIG. 4 is a schematic diagram illustrating an operational mode of a haptic actuator in accordance with an embodiment.

Referring now to FIG. 4, another operating principle is the first and second bodies 41a, 41b or two moving masses in the same angular direction. When the first and second bodies 41a, 41b move in the same direction, the system or haptic actuator 40 may be modeled as one lumped mass rotating around the origin. This pure rotation provides an equal torque with opposite direction to the electronic device 20. In other words, by changing the direction of the moving mass or the first and second bodies 41a, 41b, a pure torque-like haptic experience may be provided to the user. The feature may be particularly useful in gaming (e.g., car race games), and relatively hard to be emulated with one traditional LRA.

The torque delivered by haptic actuator 40 may be modeled differently between transient and steady states. During the transient state, assuming delta_t=time between zero speed and steady rotation, w=steady-state angular speed of the mass or first and second bodies 41a, 41b, m=the weight of each of the first and second bodies, and R=radius of the ring track or arcuate track 43, below is the equation of the torque $M_1$ from the haptic actuator 40 to an electronic device when the haptic actuator is being ramped up/down:

$$M_1 = \frac{2 \times m \times R^2 \times w}{\Delta t}$$

On the other hand, the torque delivered during steady state depends on the friction force between the moving mass or first and second bodies 41a, 41b and the arcuate or circular track 43. Assuming f=friction force between one body 41a, 41b and the arcuate track 43, and R=radius of the arcuate track, the torque $M_2$ delivered during steady state:

$$M_2 2 = 2 \times f \times R$$

Figure 5:
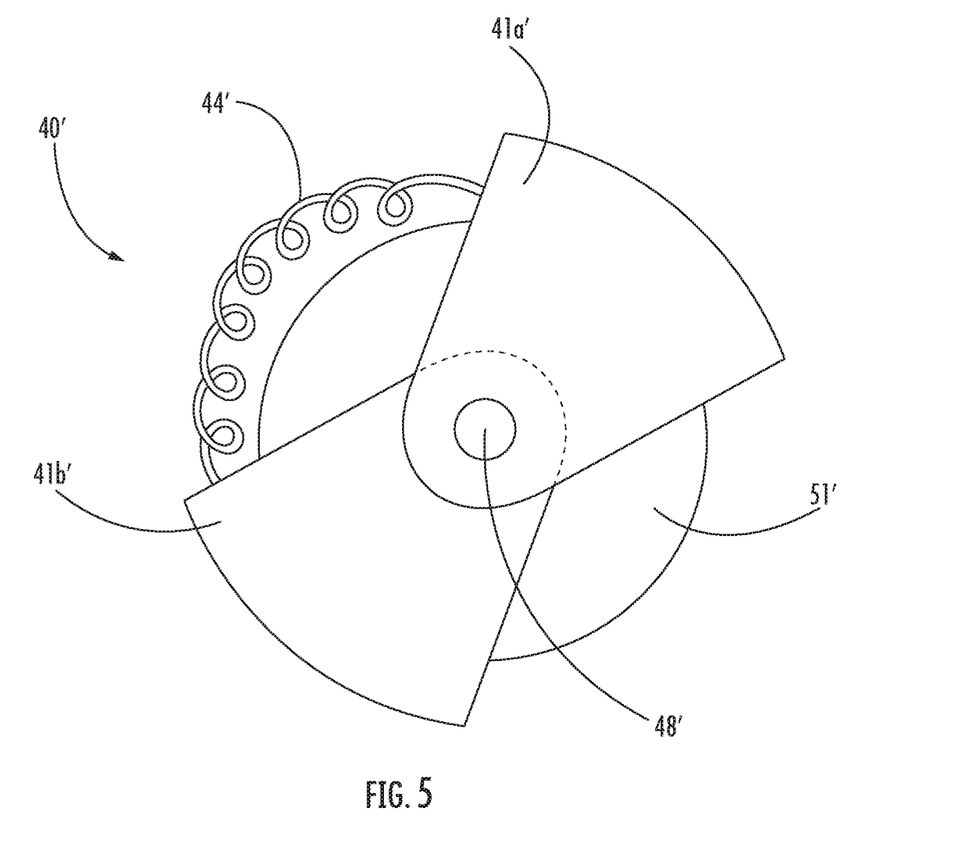
FIG. 5 is a top schematic view of a haptic actuator in accordance with another embodiment.
Figure 6:
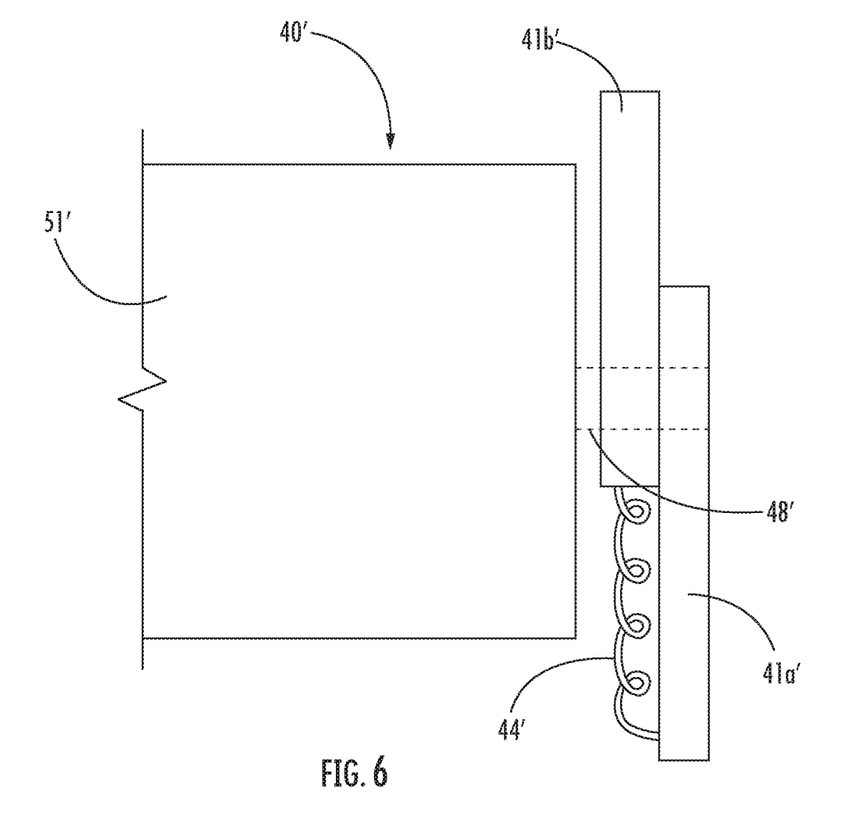
FIG. 6 is a side schematic view of the haptic actuator of FIG. 5.

Referring now to FIGS. 5-6, in another embodiment, the haptic actuator 40' may include an electric motor 51'. A pivot point 48' mounts the first and second bodies 41a', 41b'. The pivot point 48' is illustratively in the form of a shaft. The pivot point 48' may be in the form of another type of pivot point. The first and second bodies 41a', 41b' may be off-center with respect to the pivot point 48' or may be eccentric rotating masses, for example. One of the first and second bodies 41a', 41b' may be fixed to the pivot point 48' or shaft.

Similar to the embodiments above, a biasing member illustratively in the form of a spring 44' is coupled between the first and second bodies 41a', 41b' to bias the first and second bodies in spaced apart relation. It should be understood that the first and second bodies 41a', 41b' being mounted to the pivot point 48' or shaft, each of the first and second bodies is movable along an arcuate path of travel. That is, the arcuate path of travel may extend in different planes, for example, or in the same plane as described above.

A method aspect is directed to a method of producing a haptic effect. The method may include operating at least one electrical coil 45 of a haptic actuator 40 to move first and second bodies 41*a*, 41*b* of the haptic actuator along an arcuate path of travel to produce the haptic effect. The haptic actuator 40 may include a biasing member 44 coupled between the first and second bodies 41*a*, 41*b*.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A haptic actuator comprising:
  an arcuate track;
  first and second bodies mounted to the arcuate track and movable along an arcuate path of travel defined by the arcuate track;
  a spring coupled between the first and second bodies and permitting biased relative movement between the first and second bodies so that the first and second bodies are movable along the arcuate track relative to each other; and
  at least one electrical coil configured to move the first and second bodies along the arcuate track to produce a haptic effect.

2. The haptic actuator of claim 1 wherein the arcuate path of travel comprises at least a portion of a circular path of travel.

3. The haptic actuator of claim 1 further comprising a controller configured to operate the at least one electrical coil to move the first and second bodies in opposite directions.

4. The haptic actuator of claim 1 further comprising a controller configured to operate the at least one electrical coil to move the first and second bodies in a common direction.

5. The haptic actuator of claim 1 wherein the first and second bodies have a same mass.

6. The haptic actuator of claim 1 wherein the first and second bodies each comprises magnetic material.

7. An electronic device comprising:
  a housing;
  wireless communications circuitry carried by the housing;
  a haptic actuator carried by the housing and comprising
    an arcuate track,
    first and second bodies mounted to the arcuate track and movable along an arcuate path of travel defined by the arcuate track,
    a spring coupled between the first and second bodies and permitting biased relative movement between the first and second bodies so that the first and second bodies are movable along the arcuate track relative to each other,
    at least one electrical coil configured to move the first and second bodies along the arcuate track to produce a haptic effect; and
  a controller coupled to the wireless communications circuitry and the haptic actuator and configured to perform at least one wireless communications function and operate the haptic actuator, respectively.

8. The electronic device of claim 7 wherein the arcuate path of travel comprises at least a portion of a circular path of travel.

9. The electronic device of claim 7 wherein the controller is configured to operate the at least one electrical coil to move the first and second bodies in opposite directions.

10. The electronic device of claim 7 wherein the controller is configured to operate the at least one electrical coil to move the first and second bodies in a common direction.

11. A method of producing a haptic effect comprising:
  operating at least one electrical coil of a haptic actuator to move first and second bodies of the haptic actuator along an arcuate path of travel to produce the haptic effect, the haptic actuator comprising an arcuate track mounting the first and second bodies and defining the arcuate path of travel, and a spring coupled between the first and second bodies and permitting biased relative movement between the first and second bodies so that the first and second bodies are movable relative to each other along the arcuate track.

12. The method of claim 11 wherein the arcuate path of travel comprises at least a portion of a circular path of travel.

13. The method of claim 11 wherein operating the at least one coil comprises using a controller to operate the at least one coil to move the first and second bodies in opposite directions.

14. The method of claim 11 wherein operating the at least one coil comprises using a controller to operate the at least one coil to move the first and second bodies in a common direction.

15. A haptic actuator comprising:
  a shaft defining a common pivot point;
  first and second bodies coupled to the shaft and movable about the common pivot point along an arcuate path of travel;
  a biasing member coupled between the first and second bodies and permitting biased relative movement between the first and second bodies so that the first and second bodies are movable about the common pivot point relative to each other; and
  at least one electrical coil configured to move the first and second bodies about the common pivot point, the at least one electrical coil being configured to move the first and second bodies
    in opposite directions such that the first and second bodies move away from one another to produce a first haptic effect, and
    in a same direction such that the first and second bodies move to produce a second haptic effect.

16. The haptic actuator of claim 15 wherein the arcuate path of travel comprises at least a portion of a circular path of travel.

17. The haptic actuator of claim 15 further comprising a controller configured to operate the at least one electrical coil to move the first and second bodies in the opposite directions.

18. The haptic actuator of claim 15 further comprising a controller configured to operate the at least one electrical coil to move the first and second bodies in the same direction.

19. The haptic actuator of claim 15 wherein the first and second bodies have a same mass.

20. The haptic actuator of claim 15 wherein the first and second bodies each comprises magnetic material.

21. The haptic actuator of claim 15 wherein the biasing member comprises a spring.

22. An electronic device comprising:
  a housing;
  wireless communications circuitry carried by the housing;
  a haptic actuator carried by the housing and comprising a shaft defining a common pivot point,
first and second bodies coupled to the shaft and movable about the common pivot point along an arcuate path of travel,
a biasing member coupled between the first and second bodies and permitting biased relative movement between the first and second bodies so that the first and second bodies are movable about the common pivot point relative to each other, and
at least one electrical coil configured to move the first and second bodies about the common pivot point, the at least one electrical coil being configured to move the first and second bodies
in opposite directions such that the first and second bodies move away from one another to produce a first haptic effect, and
in a same direction such that the first and second bodies move to produce a second haptic effect; and
a controller coupled to the wireless communications circuitry and the haptic actuator and configured to perform at least one wireless communications function and operate the haptic actuator, respectively.

23. The electronic device of claim 22 wherein the arcuate path of travel comprises at least a portion of a circular path of travel.

24. The electronic device of claim 22 wherein the controller is configured to operate the at least one electrical coil to move the first and second bodies in the opposite directions.

25. The electronic device of claim 22 wherein the controller is configured to operate the at least one electrical coil to move the first and second bodies in the same direction.

26. A method of producing a haptic effect comprising:
operating at least one electrical coil of a haptic actuator to move first and second bodies of the haptic actuator along an arcuate path of travel, the haptic actuator comprising a shaft defining a common pivot point mounting the first and second bodies, and a biasing member coupled between the first and second bodies and permitting biased relative movement between the first and second bodies so that the first and second bodies are movable relative to each other about the common pivot point, the at least one electrical coil being operated to move the first and second bodies
in opposite directions such that the first and second bodies move away from one another to produce a first haptic effect, and
in a same direction such that the first and second bodies move to produce a second haptic effect.

27. The method of claim 26 wherein the arcuate path of travel comprises at least a portion of a circular path of travel.

28. The method of claim 26 wherein operating the at least one electrical coil comprises using a controller to operate the at least one electrical coil to move the first and second bodies in the opposite directions.

29. The method of claim 26 wherein operating the at least one electrical coil comprises using a controller to operate the at least one electrical coil to move the first and second bodies in the same direction.

30. The method of claim 26 wherein the first and second bodies have a same mass.

31. The method of claim 26 wherein the first and second bodies each comprises magnetic material.

* * * * *